Aug. 20, 1968  W. H. RANDALL  3,398,049
PLURAL ARTICLE MOLDING MACHINE
Filed Sept. 8, 1965
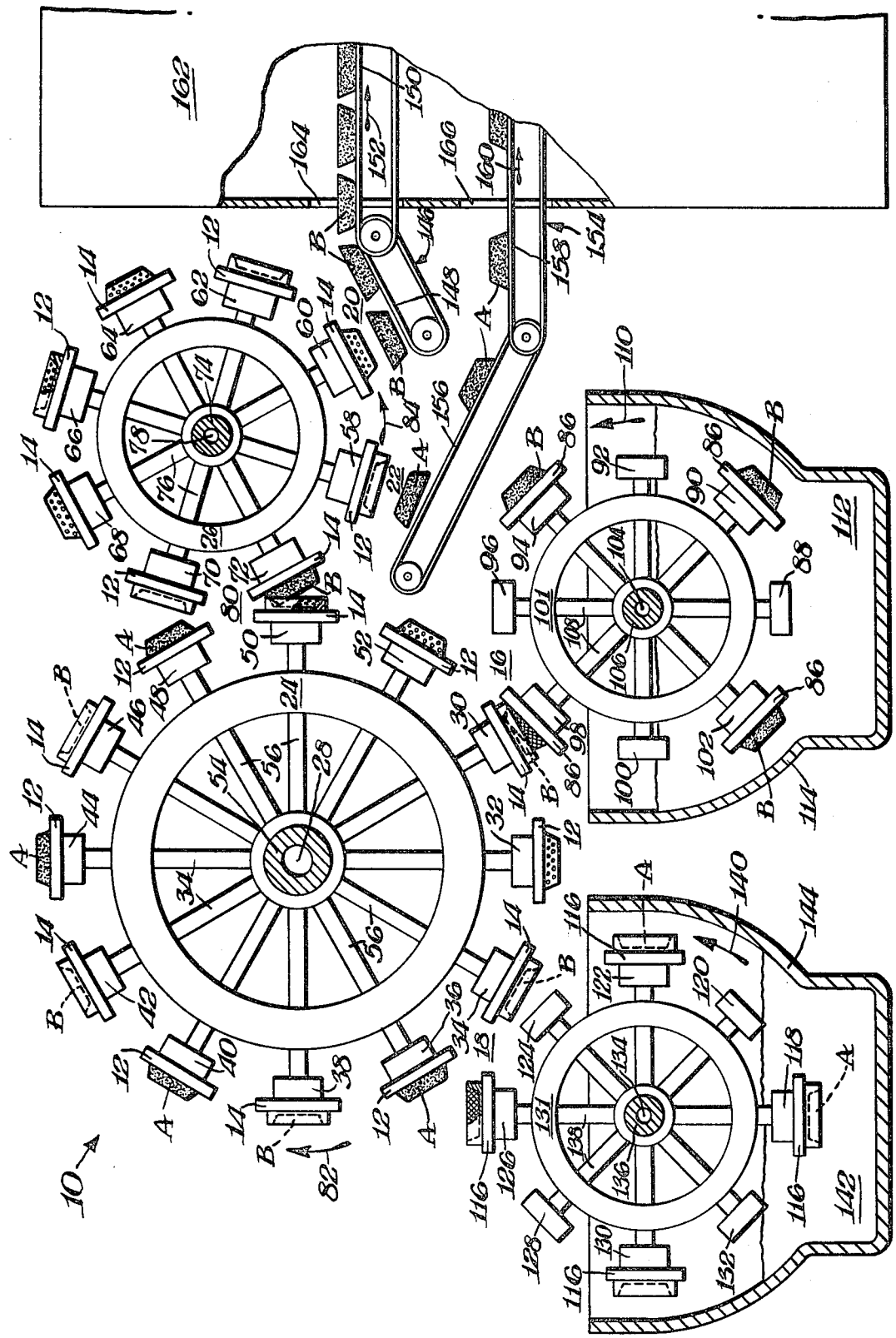

United States Patent Office 3,398,049
Patented Aug. 20, 1968

3,398,049
PLURAL ARTICLE MOLDING MACHINE
Walter H. Randall, Waterville, Maine, assignor to Keyes Fibre Company, Waterville, Maine, a corporation of Maine
Filed Sept. 8, 1965, Ser. No. 485,771
5 Claims. (Cl. 162—390)

This invention relates to plural article molding machines, and more particularly to a unitary pulp molding machine for producing simultaneously a plurality of molded pulp articles having divergent characteristics.

It has long been the practice to mold pulp articles on open-face suction molding dies by traversing the screen covered dies through a tank or vat containing a supply of the desired aqueous pulp slurry. The sheet or coating of pulp which is deposited by suction on each molding die is thereafter transferred by controlled air pressure differentials to a mating open-face pressing and transfer die. The transfer dies thereafter carry the damp molded articles, while maintaining their shapes, to a drying arrangement where the residual water is expelled to produce molded pulp articles.

The drying arrangement for high volume mass production operations customarily comprises either a flat belt conveyor which transports the articles through a heated drying chamber, or a series of open-face supporting molds mounted on a conveyor to transport the articles through a heated drying chamber. The open-face suction dies for initially molding the articles are conveniently mounted around the periphery of a molding shaft or first turret which rotates about a horizontal axis, the lower portion of the turret acting to submerge the molding dies in a source of the desired aqueous pulp slurry for the desired amount of time while suction from a remote source is applied to the dies.

The transfer dies are customarily mounted on a second turret or pressing shaft mounted for rotary motion about a horizontal axis parallel with and spaced above the axis of the forming die turret. Often, the circular path traversed by the turret mounted pressing and transfer dies carries them directly to a point above, and moving in the same direction as, the feed-in end of the dryer conveyor means. At this point or station, the damp molded articles are transferred or dropped from the transfer dies to the dryer conveyor means with a smooth motion. On the other hand, it is occasionally found desirable to provide a third turret or shaft including transfer dies mounted around its periphery. This turret is also mounted for rotary motion about a horizontal axis parallel with and spaced from the axis of the pressing or transfer die turret so as to be located above the feed-in end of the dryer conveyor means. The final turret is usually provided to insure that the directional motion of the articles corresponds with the directional motion of the dryer conveyor means at the time the articles are transferred. Either arrangement may be employed to insure transfer or drop of articles from the transfer dies to the dryer conveyor means without abrupt direction changes which would tend to distort the damp articles. It has been found necessary, however, that one or the other or some equivalent arrangement be provided for transferring the damp articles from the molding dies to the dryer conveyor means.

While the above machinery is all well-known, it has long been recognized that the expense of such machinery is high. The dryer conveyors extend through an elongated, ordinarily horizontal drying chamber which occupies a large amount of expensive plant floor space, as well as requiring expensive heating equipment and delicate control mechanism. The large rotary turrets which carry the transfer and pressing dies are extremely expensive, when it is borne in mind that their primary purpose is simply to transfer damp molded articles from the forming die means to the dryer conveyor means. A very large number of identical transfer dies is required, especially when two transfer turrets are employed to insure proper rotary direction for smooth deposit of molded articles on the dryer conveyor means.

In spite of the large expense which such equipment entails, it has not heretofore been possible to manufacture articles of varying or divergent characteristics on a single machine at one time, with the obvious exception of articles which vary only in shape but which require identical values in regard to article shape, all pulp slurry characteristics, immersion time of the forming dies, drying requirements, and the like. This, for instance, is because the supply of aqueous pulp slurry in the tank or vat is kept constant as to the type of pulp material, the type of additives, the coloring of the solution, the viscosity of the solution, and the like. The immersion time of the molding dies cannot easily be altered. The drying means is normally kept constant in regards to the speed of the conveyor which determines the length of time the articles are in the drying chamber, the temperature conditions at various points along the drying chamber, the draft and other conditions within the drying chamber, and the like.

Accordingly, with such known machinery, when it is desired to produce articles of different characteristics, the large number of suction molding dies mounted on the periphery of the molding die turret must be changed. The nature of the pulp slurry in the vat or tank may need changing. The speed of the dryer conveyor may need changing. The various controls on the drying chamber may need changing. And, of course, the transfer die turret or turrets must be equipped with the large number of proper open-face transfer dies, and space must be allocated for storing the large number of transfer dies which are removed. The expense of this complex changeover procedure becomes prohibitively large on smaller production runs where only limited numbers of articles of one kind are to be produced at a given plant. That is, when a number of relatively small runs of articles having divergent characteristics is to be made, the frequent "down time" and the expense of the change-over procedure increases the manufacturing cost of all the articles by a considerable percentage. Additionally, shipping schedules for standing orders of small runs frequently overlap, and the storage space for finished articles awaiting shipment must be increased to accommodate the balance of the run of each article.

Accordingly, it is an object of the present invention to provide a continuous type pulp molding machine wherein plural articles having divergent characteristics may be produced simultaneously on a single machine utilizing a single transfer arrangement and a single drying chamber.

Another object of the present invention is to provide a pulp molding machine comprising a first set of plural transfer dies and a second set of plural transfer dies for handling articles having divergent characteristics, the individual dies of the two sets being mounted in alternating fashion in a single endless line for shifting motion along a predetermined figure 8 type orbital path past four spaced article transfer stations, means at the first station connected to transfer molded articles having one set of characteristics seriatim from first open-face molding dies to the individual transfer dies of one of the sets as the dies shift past the first station, means at the second station connected to transfer molded articles having another set of characteristics seriatim from second open-face molding dies to the individual transfer dies of the other set as the dies shift past the second station, means at the third station connected to transfer articles to a first dryer conveyor from the transfer dies of one of the sets as the individual dies shift past the third station, and means at the fourth station connected to transfer articles to a second dryer conveyor from the transfer dies of the other set as the individual dies shift past the fourth station whereby molded articles from one of the molding die means are transferred along portions of the orbital path to one of the dryer conveyors and molded articles from the other molding die means are transferred along portions of the same orbital path but to the other dryer conveyor.

Other objects and advantages of the present invention will become apparent to one skilled in the art from a reading of the following description in conjunction with the accompanying schematic drawing.

Referring in more particularly to the drawing, one embodiment of the machine 10 for molding plural types of pulp articles according to this invention generally comprises a first set 12 of plural transfer dies and a second set 14 of plural transfer dies. The individual dies of the two sets 12, 14 are mounted in alternating fashion in a single endless line for shifting motion along a predetermined figure 8 type orbital path past four spaced article transfer stations 16, 18, 20 and 22.

The orbital path for the individual transfer dies is defined by a first transfer die turret 24 and a tangentially positioned second transfer die turret 26. The first turret 24 is mounted for continuous rotary motion about a horizontal axis 28 and includes a plurality of transfer die support elements 30, 32, 34, 36, 38, 40, 42, 44, 46, 48, 50 and 52 spaced around its periphery and connected to a central hub 54 by means of spoke-like conduit arrangements 56.

The second transfer die turret 26 includes a plurality of transfer die support elements 58, 60, 62, 64, 66, 68, 70 and 72 spaced around its periphery and connected to another central hub 74 by means of similar spoke-like conduit arrangements 76. The second transfer die turret 26 is also mounted for continuous rotary motion about a horizontal axis 78 parallel with and spaced from the axis of rotation 28 of the first transfer die turret.

Each of the transfer die support elements 30–52 of the first transfer die turret 24 and the transfer die support elements 58–72 of the second transfer die turret 26 may be of conventional design in that they are adapted to support a wide range of transfer dies 12, 14. As is well-known, each of the transfer die support elements is connected by the spoke-like conduit arrangements to the central hub of the respective turret. Suitable stuffing box porting arrangements are provided at the axial ends of the turrets whereby the various transfer dies mounted on the support elements may be ported to a source of suction, to atmosphere, or to a source of pressurized air at predetermined peripherally located stations. Accordingly, as each transfer die 12, 14 passes a given point in its orbital path, the supply of suction or pressure is controlled to perform the desired article handling maneuver. For instance, at a station 80 located on a line which connects the axes 28 and 78 of the turrets 24 and 26, respectively, the molded articles are transferred from the transfer dies of the turret 24 to the transfer dies of the turret 26. The articles are held, for instance, on the transfer dies of the turret 24 by suction and, when the station 80 is reached, the connection with the source of suction is closed and the connection with the source of pressure is opened to blow the articles off the die. At this point, the mating transfer die on the turret 26 is connected with the source of suction to insure pick-up of the damp molded articles.

Additionally, as is well-known with this type of machinery, the turrets are driven continuously in unison by means of large bull gears or other mechanical arrangements, not shown, to insure that the surface speeds of the two turrets coincide. This permits a shifting of articles from the transfer dies of one turret to the transfer dies of the other turret with a smooth, continuous motion.

As can be seen in the schematic drawing, the transfer dies of the two sets 12 and 14 are mounted in a single endless line lying in a plane perpendicular to the axes of rotation of the two transfer die turrets. The orbital path which the individual transfer dies follow may thus be referred to as a figure 8 type orbital path. As can be seen from the direction arrow 82, the first transfer turret 24 rotates in a clockwise direction; whereas, the second transfer turret 26 rotates in a counterclockwise direction as indicated by the direction arrow 84. Although only a single endless line of individual transfer dies 12, 14 is illustrated, it will of course be understood that a plurality of such lines may be included on a single machine according to this invention. In such a case, the plural oribtal paths each occupy parallel spaced vertical planes all of which are perpendicular to the horizontal axes of rotation of the turrets. Each turret, in addition to having the plurality of transfer die support elements positioned around its periphery, then, would include a series of corresponding support elements positioned axially along an elongated turret. However, to describe the principles of this invention, it has been deemed necessary to illustrate only one single endless line of transfer dies running along a figure 8 type oribtal path.

First open-face suction molding dies 86 are mounted for continuous motion along an orbital path which coincides at the first transfer station 16 with the orbital path of the individual transfer dies 14. The molding dies 86 are mounted on a plurality of molding die support elements 88, 90, 92, 94, 96, 98, 100 and 102 mounted on the periphery of a first molding die turret 101 mounted for continuous rotary motion about a horizontal axis 104. The support elements are connected to a central hub 106 by means of spoke-like conduit arrangements 108. The molding die turret 101 is driven counterclockwise as indicated by the direction arrow 110, and the molding dies 86 are carried thereby through a supply 12 of pulp slurry in a vat or tank 114.

Second open-face suction molding dies 116 are mounted for continuous motion along an orbital path which coincides at the second transfer station 18 with the orbital path of the individual transfer dies 12. The molding dies 116 are mounted on a plurality of of molding die support elements 118, 120, 122, 124, 126, 128, 130 and 132 mounted on the periphery of a second molding die turret 131 mounted for continuous rotary motion about a horizontal axis 134. The support elements are connected to a central hub 136 by means of spoke-like conduit arrangements 138. The molding die turret 131 is driven counterclockwise as indicated by the direction arrow 140, and the molding dies 116 are carried thereby through a supply 142 of pulp slurry in a vat or tank 144.

The first molding die turret 101 and the second molding die turret 131 are driven in conventional fashion by bull gears or other mechanical arrangements, not shown, so that their surface or peripheral speed corresponds with the peripheral speed of the transfer die turret 24. Additionally, the various molding die support elements 86–102 on the turret 101 and the support elements 118–132 on the turret 131 are connected with suitable sources of suction, atmosphere, or pressurized air by means of conventional stuffing box porting drums at the axial ends of the turrets. As is well known, the suction is applied to the molding dies as they are rotated through the source of pulp slurry to deposit a sheet or blanket of fibrous pulp material on the open-face screen covered dies 86, 116. Suction is continued to be applied to a given molding die until it reaches the station, such as 16 or 18, in its orbital path where the damp molded article is to be shifted to a mating transfer die on the adjacent transfer turret 24. At that point, the source of suction is closed and a source of pressurized air is opened to insure separation of the article from the molding die. At generally the same point, the transfer die is connected with a source of suction to insure smooth and proper pick-up of the damp molded article and carry it away from the vicinity of the molding die turret. As is well known, the articles are frequently subjected to a desired pressing operation as the molding die and transfer die come together to transfer an article. Finally, as is conventional, the molding die support elements 88–102 and 118–132 are adapted to mount a wide variety of suction molding dies depending upon the nature of the molded pulp article to be produced.

While the present description merely illustrates molding die support elements and transfer die support elements which are rigidly mounted relative to their respective turrets, it will be understood that the die support elements of the various turrets ordinarily include additional cam-following mechanism riding in stationary cams to cant or tilt the dies at the pressing and transfer stations so that the zone where the dies come into mating relationship is prolonged. Such mechanism is conventional and ordinarily is desirable, but has been omitted from the schematic drawings simply for purposes of clarity. Obviously, the invention contemplates turret mounted dies wherein such mechanism is employed.

Additionally, the molding die turrets include a corresponding number of rings or circles of die support elements in longitudinal array as the trasnfer die turrets, as is well known and as is mentioned above in connection with the transfer die turrets.

A first dryer conveyor 146 comprising a series of narrow, parallel endless belt conveyors 148 and a series of narrow, parallel endless belt conveyors 150 is positioned to convey damp molded pulp articles from the transfer station 20 in the direction of the arrow 52 through a drying chamber. A second dryer conveyor 154 comprising a similar series of endless belt conveyors 156 and 158 is positioned to convey damp molded pulp articles from the transfer station 22 in the direction of the arrow 160 through the same drying chamber.

The drying chamber 162 includes suitable openings 164 and 166 in its forward wall to allow passage of the articles on the dryer conveyors. Although one end only of the elongated drying chamber 162 is illustrated, it is to be understood that normally such structures are many feet in length and occupy a large amount of plant floor space. Additionally, the details of the structure of the drying chamber 162 have not been illustrated, but it will be understood that the structure is equipped with suitable heating elements, suitable draft control elements and other arrangements for controlling the drying conditions at various points along the length of the drying chamber. It will be noted that the dryer conveyor 146 is spaced horizontally above the conveyor 154, and each includes a reach which conveys articles along separate essentially linear paths running parallel with and spaced vertically from each other. Depending upon the heating elements, baffle or draft control elements and the like in the chamber 162, the drying conditions to which the articles on each conveyor 146, 154 are subjected may be controlled as desired. Additionally, the length of time which different articles will be subjected to the desired drying conditions may be varied by controlling the speed of the conveyors relative to each other. Naturally, if a shorter drying time is required for a given type of article, the dryer conveyor upon which they are supported may be run at a higher speed than the conveyor which supports articles requiring longer drying times. Finally, it will be appreciated that plural, separate elongated ovens, one for each conveyor, may be included within the chamber 162 to further control the individual drying requirements of the articles.

As noted above, the second transfer die turret 26 rotates in a counterclockwise direction in accordance with the directional arrow 84. At both transfer stations 20 and 22, the transfer dies 14, 12 are thus located closely above and moving in the same direction as the dryer conveyors 146 and 154. At the third article transfer station 20, the source of suction to the support element which is positioned over the conveyor 146 is closed, and the connection with a source of pressurized air is opened to insure a smooth transfer or drop of the damp molded article to the dryer conveyor 146. Similarly, at the fourth article transfer station 22, the transfer die support element located adjacent the feed-in end of the conveyor 154 has its connection with the source of suction closed, and its connection with the source of pressurized air opened. Again, this serves to effect a smooth placement of the damp molded articles on the conveyor 154.

In operation, the above described apparatus operates as follows. First, the open-face molding dies 86 are submerged in the supply of pulp slurry 112 in the tank 114 to deposit by suction a sheet of molded pulp thereon. As the molding dies 86 are rotated to the station 16, molded articles B are transferred to the second set of transfer dies 14 on the first transfer turret 24, usually incorporating a pressing operation as well. Thereafter, the articles are carried by the transfer dies 14 in the direction of the arrow 82 until, at the station 80, the articles B are transferred to the mating transfer dies 14 on the second transfer die turret 26. Finally, at the third article transfer station 20, the still damp molded articles B are dropped smoothly on the dryer conveyor 146 by which they are transferred along an essentially linear path through the drying chamber 162.

Simultaneously, the open-face molding dies 116 on the second molding die turret 131 are submerged in the supply 142 of pulp slurry in the vat 144, where a sheet of pulp is deposited by suction thereupon. As the molding dies 116 reach the second article transfer station 18, by suitable suction and pressure differentials, molded articles A are transferred to the mating transfer dies 12 on the first transfer die turret 24, usually incorporating a pressing operation as well. Thereafter, the articles are transferred in the direction of the arrow 82 until the station 80 is reached. At this point, the articles A are transferred to the mating transfer dies 12 of the second transfer die turret 26. Thereafter, as the transfer dies 12 reach the fourth article transfer station 22 at the feed-in end of the second dryer conveyor 154, the articles A are transferred to the conveyor 154 for transfer along the essentially linear path through the very same drying chamber 162 as the molded articles B are being conveyed through.

While the above brief outline summarizes the operational aspects of the molding machine of this invention, the following specific examples will serve to illustrate the extremely large number of possible variations of operations which may be carried out. In the schematically illustrated embodiment, the source 112 of pulp slurry in the vat 114 may be of any desired characteristic. Additionally, its depth may be regulated to control the length of time that each molding die 86 is submerged. In the vat 114, the depth is relatively great, thus insuring a longer time for the deposition of pulp on the molding die. For the purpose of illustration, it will be assumed that the articles B formed in the vat 114 will be somewhat thicker than the average molded pulp article, and thus will require a somewhat longer drying time.

The supply 142 of pulp slurry in the other vat 144, on the other hand, is relatively shallow thus insuring that the articles A are to be thinner than average. Naturally, it will be appreciated that the color, consistency, ingredient, and other factors of the slurry 142 may vary widely from the characteristics of the slurry 112 in the vat 114. The articles A formed by the molding dies 116 on the turret 131 will thus require a shorter drying time than the articles B.

The first molding die turret 101 includes four similar shaped open-face molding dies 86 of the male variety mounted on the support elements 90, 94, 98 and 102. The die support elements 88, 92, 96 and 100 are dead-ended or blocked-off. Similarly, on the second molding die turret 131, four similar shaped molding dies 116 of the female variety are mounted on the support elements 118, 122, 126, and 130, and the die support elements 120, 124, 128 and 132 are dead-ended or blanked-off.

To accommodate this optional positioning of two differently shaped sets of open-face molding dies, the first transfer die turret 24 includes a plurality of transfer dies 14 adapted to handle the articles B which are formed on the male molding dies 86 of the turrent 101. Such transfer dies 14 are mounted on the support elements 30, 34, 38, 42, 46 and 50. Similarly, mating open-face transfer dies 14 adapted to handle the articles B are mounted on the support elements 60, 64, 68 and 72 of the second transfer die turret 26.

The open-face transfer dies 12 which are adapted to transfer the articles A which are molded on the female molding dies 116 are positioned on the support elements 32, 36, 40, 44, 48 and 52 of the first transfer die turret 24. Similarly, mating transfer dies 12 adapted to handle the articles A between the stations 80 and 22 are mounted on the support elements 58, 62, 66 and 70 of the second transfer die turret 26.

The first dryer conveyor 146 which is adapted to transport the relatively thick articles B formed on the male molding dies 86 is connected to operate at a relatively low speed to insure that the articles B are in the upper portion of the drying chamber over a relatively long period of time. On the other hand, the dryer conveyor 154 is connected to operate at a relatively higher speed to insure that the thinner pulp articles formed on the female molding dies 116 will be subjected to the lower portion of the drying chamber for a shorter period of time.

With the above described arrangement of molding dies and transfer dies, it will be appreciated that two entirely different types of molded pulp articles having widely divergent characteristics may be produced simultaneously on the single machine of this invention. With this arrangement it will be noted that each article constitutes half of the total production of the machine. This, however, is not a limitation of this invention because it will be understood that one article can be formed on all eight stations of one forming die turret while none are formed on the other forming die turret, as is conventional or, upon reading the following specific example, it will be appreciated that the two different articles having divergent characteristics may occupy different ratios of the total production of the machine.

For instance, if it is desired that the articles B constitute ¾ of the total production of the machine, and the articles A constitute only ¼ of the production, the first molding dies 86 are mounted on the support elements 90, 92, 94, 98, 100 and 102 of the turret 101. The support elements 88 and 96 are thus blanked-off. Similarly, the second modling dies 116 which initially form the articles B are mounted only on the support elements 118 and 126 of the second molding die turret 131. The support elements 120, 122, 124, 128, 130 and 132 are blanked-off. On the first transfer die turret 24, the transfer dies 14 which handle the articles B are mounted on the support elements 30, 32, 34, 38, 40, 42, 46, 48 and 50. The mating transfer dies 14 for handling the articles B are mounted on the support elements 60, 62, 64, 68, 70 and 72 of the second transfer die turret 26. The transfer dies 12 of the other set for handling the articles A are alternately arranged, although not on a one to one basis. For instance, the transfer dies 12 for handling the articles A initially formed on the female molding dies 116 are mounted on the support elements 36, 44 and 52 of the first transfer die turret 24 and on the support elements 58 and 66 of the second transfer die turret 26. In this manner, as can be understood, the continuous operation of the machine will produce three of the B articles for every one of the A articles produced, and the machine will run continuously producing the desired quantities of both divergent articles simultaneously.

While the two molding die turrets 101 and 131, as well as the second transfer die turret 26, each included eight die support elements circumferentially spaced around their peripheries, and the first transfer die turret 24 includes 12 such die support elements spaced around its periphery, it will be appreciated that other combinations of dies may be utilized with other turret arrangements if desired. For instance, it is entirely possible to utilize three molding die turrets feeding to one transfer die turret, in which case the second transfer die turret would deposit articles upon any one of three dryer conveyors all running through the same drying chamber. Additionally, as noted above, the number of die support elements on each turret may be multiplied as desired by making the axial dimension of each turret as long as feasible to include the desired number of dies. With the illustrated arrangement, if the turrets are made sufficiently long, the first transfer die turret 24 may receive damp molded articles from four molding die turrets, two circumferentially positioned as illustrated and two more axially adjacent molding die turrets running through two separate sources of pulp slurry, as is known. Moreover, the arrangement of the present machine lends itself to producing layered or composite articles consisting of first and second sheets of pulp superimposed on one another, as is known. For instance, an absorbent inner layer for a meat packaging tray may be formed on one molding turret and a sized body or outer layer formed on the other, the two being combined on the pressing and transfer shaft 24 at station 18. Thus, it can be seen that the variety attainable with the molding machine of this invention is limited only by the feasible engineering design requirements, once the concept of the invention has been grasped by the designer.

Accordingly, there has been disclosed a molding machine for simultaneously producing plural types of molded pulp articles having divergent characteristics. The machine is especially suitable for small runs of different articles to be produced simultaneously. The divergent articles removed from their respective conveyors at the exit end of the dryer conveyor may be removed to appropriate places for separate wrapping and invoicing, but for simultaneous shipment to the proper customers thus utilizing a minimum of storage space, down time, change over expense, and the like.

What is claimed is:

1. A pulp molding machine comprising a first set of plural transfer dies and a second set of plural transfer dies, the individual dies of the two sets being mounted in alternating fashion in a single endless line for shifting motion along a predetermined orbital path past four spaced article transfer stations, means at the first station for transferring molded articles seriatim from first open-face molding die means to the individual transfer dies of one of the sets as the dies shift past the first station, means at the second station for transferring molded articles seriatim from second open-face molding die means to the individual transfer dies of the other set as the dies shift past the second station, means at the third station for transferring articles to a first dryer conveyor from the transfer dies of one of the sets as the individual dies shift past the third station, and means at the fourth station for transferring articles to a second dryer conveyor from the transfer dies of the other set as the individual dies shift past the fourth station whereby molded articles from one of the molding die means are transferred along portions of the orbital path to one of the dryer conveyors and molded articles from the other molding die means are transferred along portions of the same orbital path to the other dryer conveyor.

2. A pulp molding machine as in claim 1 wherein the means at the first station includes means for shifting the first open-face molding die means along an orbital path which coincides at the first station with the orbital path of the individual transfer dies and the means at the second station includes means for shifting the second open-face molding die means along an orbital path which coincides at the second station with the orbital path of the individual transfer dies, and the orbital path of the first molding die means includes a portion which submerges the first molding die means in a first source of aqueous pulp slurry and the orbital path of the second molding die means includes a portion which submerges the second molding die means in a second source of aqueous pulp slurry.

3. A pulp molding machine as in claim 1 wherein the first dryer conveyor includes an endless belt conveyor having one reach adapted to convey articles along an essentially linear path through a generally horizontal drying chamber and the second dryer conveyor comprises an endless belt conveyor having one reach adapted to convey articles along a second essentially linear path generally parallel with and spaced vertically from the linear path established by the first dryer conveyor through the same drying chamber.

4. A pulp molding machine as in claim 1 wherein one portion of the orbital path extends generally circumferentially about a first axis and another portion extends generally circumferentially about a second axis parallel with and spaced from the first axis, and the individual dies of each set of plural transfer dies include dies mounted for shifting motion about the first axis as well as dies mounted for shifting motion about the second axis, the first and the second article transfer stations being located adjacent the portion of the orbital path which extends generally circumferentially about the first axis and the third and fourth article transfer stations being located adjacent the portion of the orbital path which extends generally circumferentially about the second axis.

5. A pulp molding machine as in claim 4 wherein the portion of the orbital path which extends generally circumferentially about the first axis is established by a rotating turret device which includes means for positioning individual transfer dies of each set around the periphery thereof and the portion of the orbital path which extends generally circumferentially about the second axis is established by another rotating turret device which includes means for positioning individual transfer dies of each set around the periphery thereof whereby articles are transferred from individual dies of the turret device which rotates about the first axis to the individual dies of the turret device which rotates about the second axis.

References Cited
UNITED STATES PATENTS

| | | | |
|---|---|---|---|
| 1,845,831 | 2/1932 | Chaplin | 162—228 X |
| 3,011,546 | 12/1961 | Peppler | 162—390 |
| 3,320,120 | 1/1967 | Randall | 162—391 |

DONALL H. SYLVESTER, *Primary Examiner.*

H. R. CAINE, *Assistant Examiner.*